Figure 1:
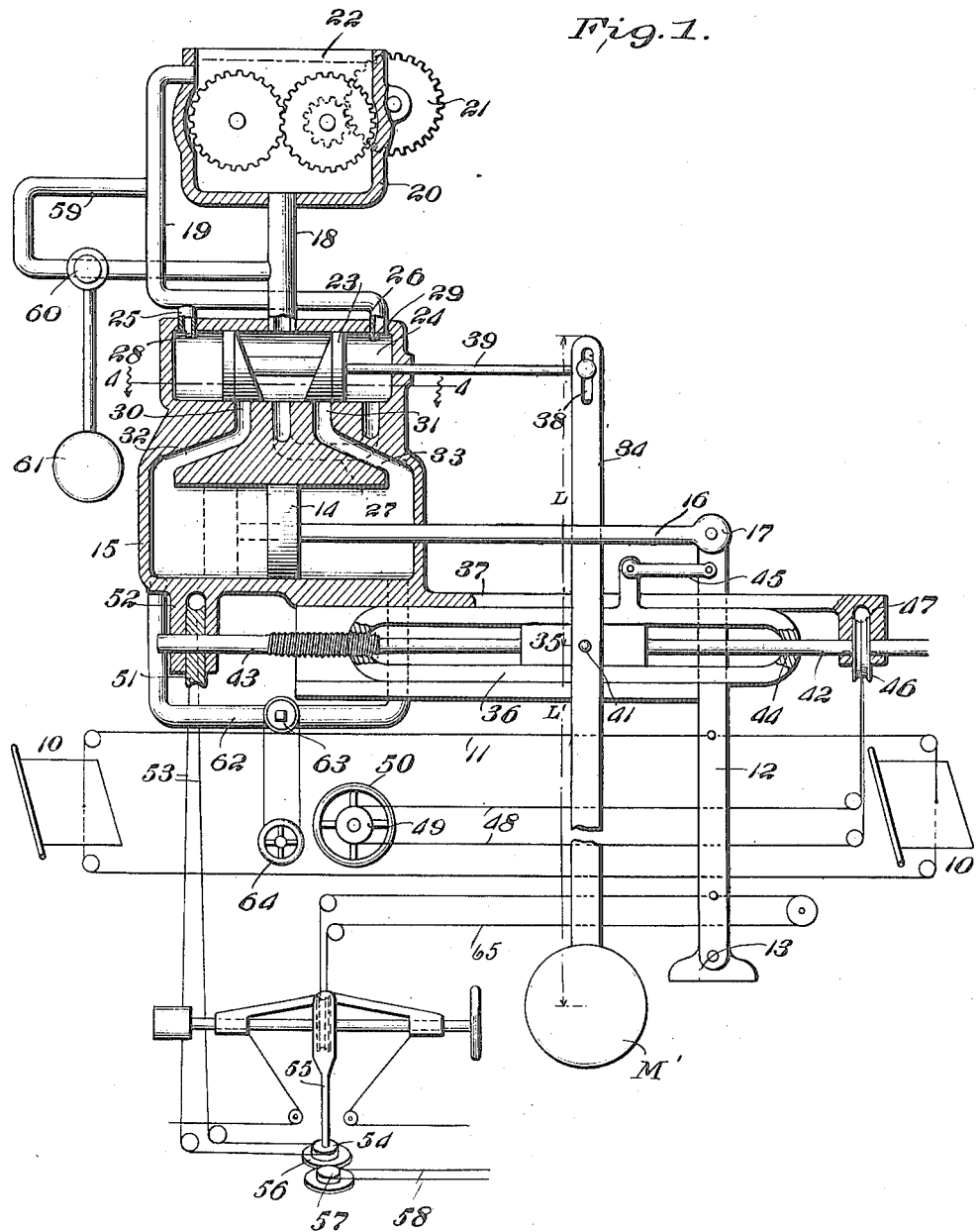

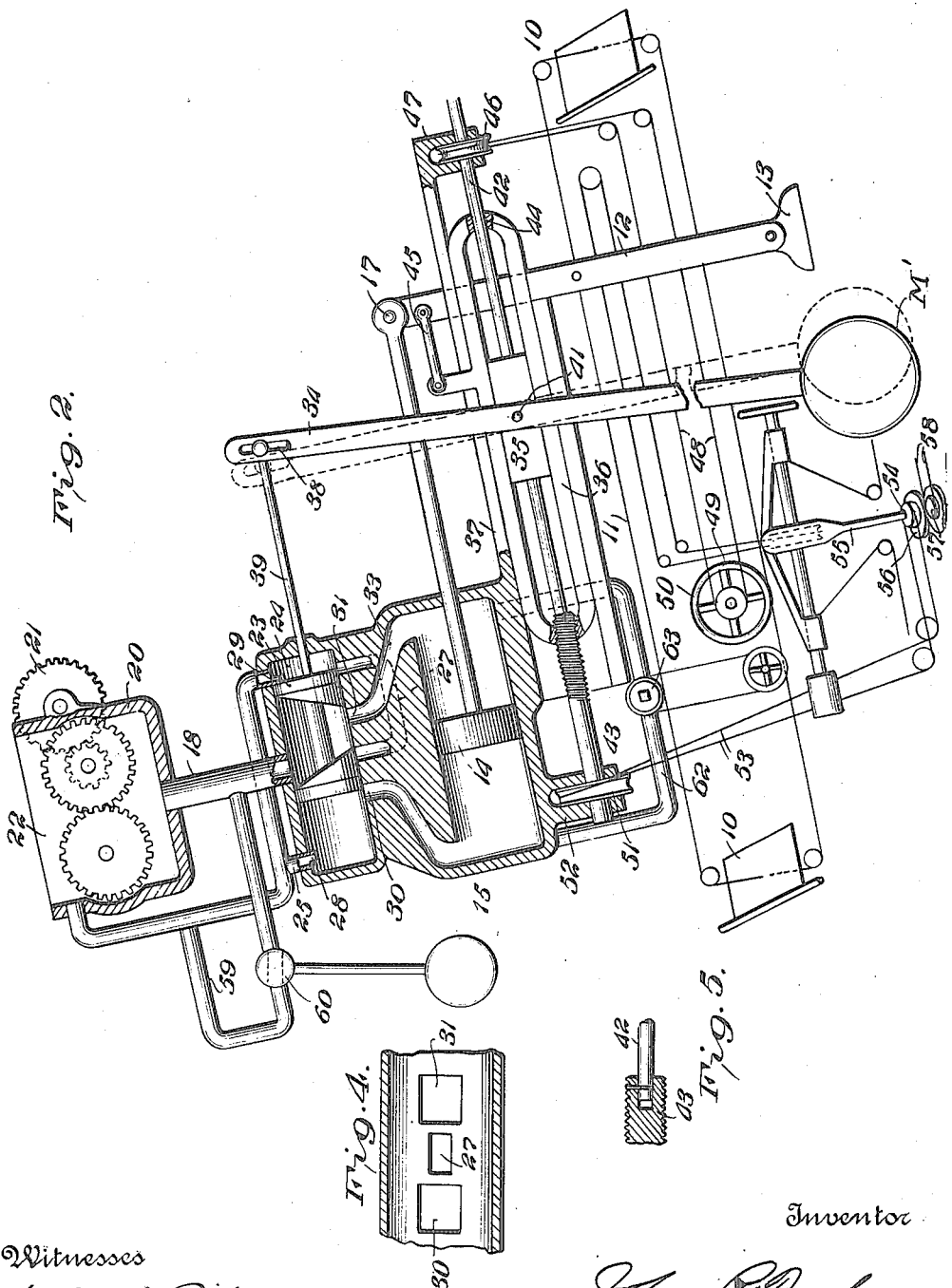

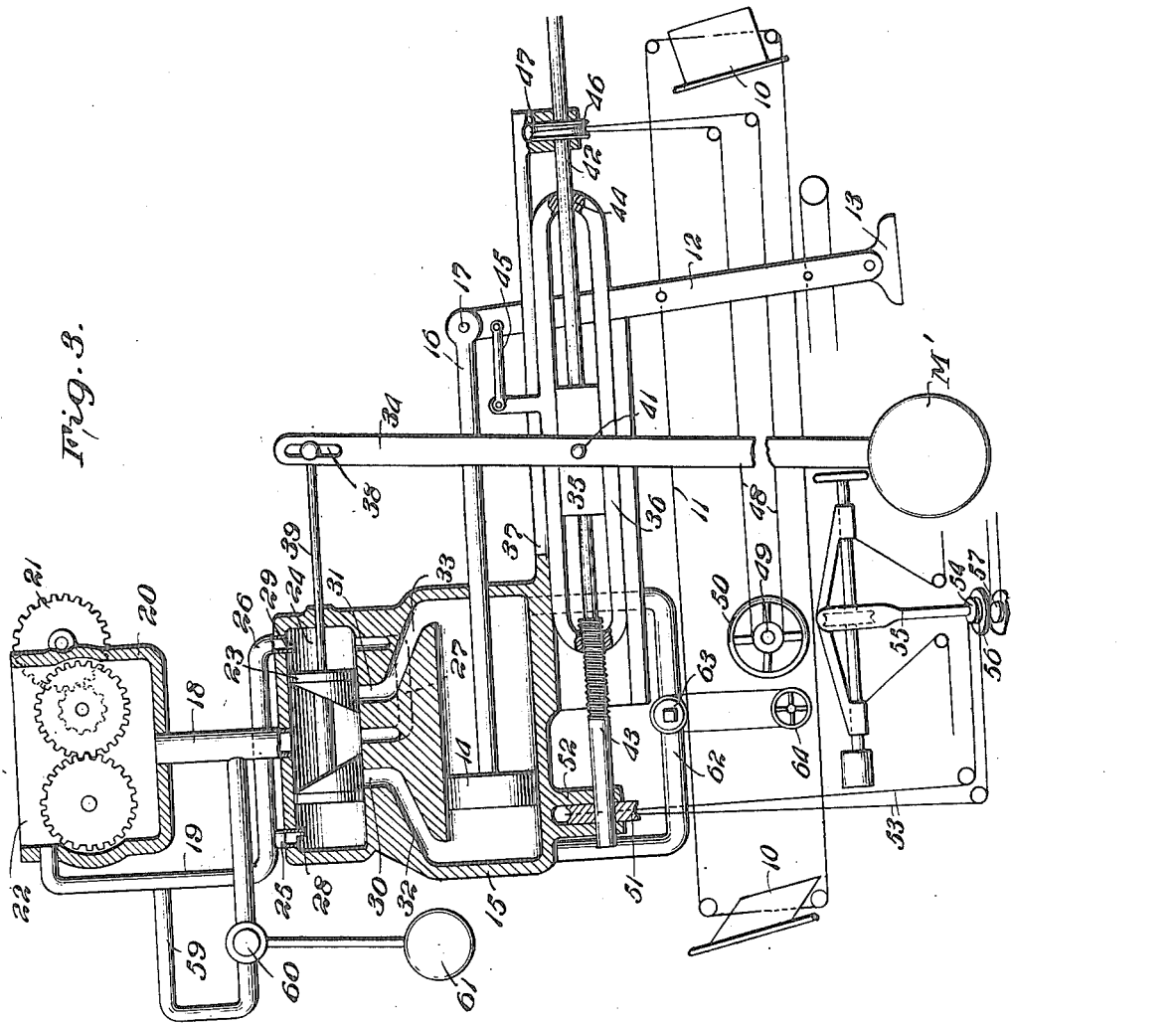

UNITED STATES PATENT OFFICE.

JOHN P. TARBOX, OF WASHINGTON, DISTRICT OF COLUMBIA, ASSIGNOR TO TARBOX SAFETY AIRCRAFT COMPANY, A CORPORATION OF DELAWARE.

BALANCING DEVICE FOR AIRCRAFT.

1,180,273.        Specification of Letters Patent.       Patented Apr. 18, 1916.

Application filed February 27, 1911. Serial No. 611,106.

*To all whom it may concern:*

Be it known that I, JOHN P. TARBOX, a citizen of the United States, residing at Washington, in the District of Columbia, have invented new and useful Improvements in Balancing Devices for Aircraft, of which the following is a specification.

My invention consists of a hydraulically operated mechanism for balancing aircraft. Broadly the invention is directed to the maintenance of lateral and fore-and-aft balance of the craft, both going straight away and around curves.

Broadly, as in my co-pending application, Serial No. 607,736, filed February 10, 1911, this invention consists in an aircraft provided with balancing devices, operating means for the same, a source of power, and a standard of position adapted to control the movement of said operating means by power supplied from said source. Modifications of the gearing connections between the standard of position and the operating means and the controlling means, have been made to the end of securing the most efficient hydraulic control.

My present invention also comprises a means giving a minor movement of the operating means to correct minor and slight unbalancing, a means giving a maximum movement for greater unbalancing, and a means which increases the rate of movement of the operating means, and hence the balancing devices, proportionally to the angle of list of the craft. Additionally, there is provided means for changing at will from automatic hydraulic control, to manual control. There are also structural and other features, minor with respect to those named, all of which will be more clearly pointed out in the detailed description following.

Of the drawings—Figure 1 is a diagrammatic view of the mechanism, showing all of the parts in their normal positions which they occupy when the craft is balanced in a horizontal plane; Fig. 2 is a similar view, showing the positions of the parts, the instant that unbalancing has taken place, and before time enough has elapsed to permit of any corrections having been made; Fig. 3 is also a similar view showing the parts of the mechanism after they have operated to effect a partial correction of the unbalancing, and showing a maximum deflection of the balancing devices; Fig. 4 is a detailed view showing the manner in which the mechanism acts to correct slight unbalancing by movements only a fraction of the maximum; and Fig. 5 is an enlarged detail showing the connection between the shafts 42 and 43.

Referring first to Fig. 1, 10, 10, are the balancing devices, which may be of any known type, as well as the Curtiss type shown. As shown, their normal position is in a horizontal plane, or in one of similar deflection, when the craft is balanced laterally. These balancing devices 10 are connected by operating cords 11, and to an operating means for the balancing devices in the form of a lever 12 fulcrumed at the bottom to a fixed support 13. This operating means comprises further an operating piston 14 working in cylinder 15, and connected to a rod 16 linked at its outer end 17 to the lever 12. This piston and cylinder constitute together a hydraulic motor. Conduits 18 and 19 are connected to the cylinder 15, and to a source of power 20 from which the cylinder is to be supplied with power. As shown this source of power is in the form of a rotary gear pump adapted to be driven by gear 21 from the engine of the air craft, or from other suitable source. These gears are contained in a tank 22, and the motor cylinder 15, the conduits 18 and 19, the passageways leading to them, and the tank are filled to the level indicated with an operating fluid, such as water or oil.

Transmission of power by the fluid through the conduits to the motor 15, is controlled by a means 23 in the form of a two-part piston valve operating in a valve chamber 24 with which the conduits 18 and 19 connect directly. The conduit 18 enters this chamber about its middle, while the conduit 19 is provided with two branches 25 and 26 which, respectively, enter the opposite ends of the valve chamber 24. A by-pass 27 extends from the middle of the valve chamber directly opposite the conduit 18, to one end of the chamber 24 opposite the branch 26. Stops 28 and 29 are provided for the purpose of limiting the movement of the valve and preventing it from closing at any time the ports of the conduits 25, 26 and 27. On the right and left of the central by-pass port 27 are cylinder ports 30 and 31, connecting by passages 32 and 33 with the opposite ends of the cylinder 15. Normally, the ports 30 and 31 are closed by the piston valve as shown, while the by-pass port 27 is open, so that the pump which operates as shown by the arrows, circulates fluid through the conduit 18, through the valve chamber 24, the by-pass 27, and by way of return conduits 26 and 19, back to the tank, there being practically no pressure on the fluid. By moving the controlling valve 23 to right or left, the by-pass may be cut off, one end of the cylinder opened to pressure, and the other end opened to exhaust, all as shown in Fig. 2.

34 is a pendulum standard of position for operating the valve 23. The pendulum is mounted upon sliding block 35 supported in sliding link 36, which in turn is supported in frame 37 connected with the cylinder 15. At its upper end the pendulum is connected to the valve 23 by means of a pin and slot connection 38 with the valve stem 39. Normally the pendulum hangs vertically, and upon movement from the vertical position moves the valve 23 through the connections just traced.

By means of a follow-up device the standard of position is shifted as the operating means moves the balancing devices in order to prevent overrunning of the same. The block 35 is screw-threaded upon a shaft 42 extending centrally through the link 36, and swiveled at one end in the shaft 43 screw-threaded in one end of the link, and passing through a clean hole 44 in the other end of the link. By means of a link connection 45 with the lever 12, the block 35 with the pendulum 34 and the link 36, is shifted laterally as the balancing devices are moved.

The shaft 42 is splined to a pulley 46 held fixed in position by means of the forks 47 on the ends of frame 37. This pulley is connected by cords 48 to hand-operated control means in the form of a drum 49, operated by hand wheel 50.

The shaft 43 to which the shaft 42 is swiveled, is splined to a pulley 51 held stationary by forks 52 from the cylinder, or other fixed support. Operating control-cords 53 extend from this pulley to a control drum 54 on the steering post 55, which has a geared connection 56 with the operating drum 57 from which control cords 58 lead to the rear rudder for lateral steering. It will be evident that upon turning the post to steer laterally, the standard of position 34 will be moved through the connections just described.

In order to release the devices from automatic control, a by-pass is provided around the motor, normally closed, but adapted to be opened by hand at any time. This by-pass is numbered 62, the controlling valve 63, and the operating hand wheel 64.

Between the inlet conduit 18 and the return conduit 19 is also provided a by-pass, numbered 59; this by-pass however, is for an entirely different purpose. It is controlled by valve 60 operated by a pendulum or other standard of position 61. The valve is normally open, as shown in Fig. 1, and is adapted to be closed to a degree proportional to the list of the craft, the standard of position effecting this closure. The cross-section of this valve opening is made equal to that of the by-pass 27, while the cross-section of the passageways 30 and 31 is made double that of the by-pass 27. The ratio of the cross-sections of the conduits and passages may be made other multiple values. It will be evident that upon closing of the valve 60, all of the fluid must pass through the inner conduit and through by-pass 27 and passageways 30 and 31 to the motor. If the by-pass 27 is closed during operation of the motor, and the motor is operating at a certain rate of speed, and thereafter the valve 60 is closed, the motor will be accelerated in speed, and this acceleration will be proportional to the degree of closure of the valve 60, which in turn is proportional to the angle of list of the craft. When it is desired to dispense with the automatic control, valve 63 is opened by means of hand wheel 64, and the fluid pressure on piston 14 will thereby be relieved, the circulation of fluid being through by-pass 62 in one direction or the other depending upon the position of the control valve when the balance of the craft is disturbed.

Connections are made from the steering gear connected with the steering post previously mentioned, to the various steering devices in the manner disclosed in my copending application S. N. 607,736, filed Feb. 10th, 1911, the steering device for the balancing means being connected by control cords 65 to the operating lever 12.

The operation of the mechanism of my invention is as follows: Assuming first the list to the left of eight or ten degrees, the mechanism and its parts simultaneously assume the position shown in Fig. 2. The parts are there represented in the positions they occupy the instant of the list and before there has been time for correction to be made. The standard of position is shown as having been moved from its vertical position normal to the transverse axis of the motor, and as having carried the valve 23 to the right, opening the left-hand port 30, closing the by-pass 27, and opening the port 31 to the pressure side of the pump. The valve 60 has closed a degree proportional to the angle of list. Immediately the piston of the motor is moved by fluid under pressure to the left, operating the balancing devices through the operating means to the position shown in Fig. 3. This operation takes place at a rate which is greater, the greater the angle of list, and the movement of the balancing devices continues, either until a certain maximum limit is reached, or until the craft commences to respond. The latter is the usual case, the deflection of the balancing devices being thus proportional to the angle of list, and to the time taken for response of the craft.

Immediately upon the response of the craft, the movement of the balancing devices is checked, and shortly after, due to the combined action of the follow-up device, which has moved the pendulum over to the left, and to the action of the craft in response, which is now moving clockwise, the pendulum is given a vertical position, shown in Fig. 3, in which the valve 23 has moved to mid position, and the motor has been stopped, the balancing devices having reached a position of maximum deflection, and the craft having partially recovered its balance. Further clockwise movement of the craft toward the horizontal causes, through the pendulum, a movement of the valve 23 to the left, whereupon the motor is operated to move the balancing devices back to normal position simultaneously with the return of the craft to normal position. Thus overrunning and overcorrection are prevented.

In going around curves the operation of the mechanism to effect a balance of the craft at a predetermined angle of list, is substantially the same as previously described, the pendulum being primarily moved through the turning of the steering post as in my prior application, the pendulum thus being given a new normal position with respect to the controlling means and the craft, whereby the craft is balanced at a new angle.

While going around the curve, the mechanism is not effected by centrifugal force or lateral inertia of its parts, since the only freely moving part, the standard of position, is made free from the effects of inertia in the horizontal plane. Such a device may also be applied to the pendulum which operates the valve 60.

While I have described the best form of my invention now known to me, it will be evident that many changes may be made by those skilled in the art without departing in any wise from the generic spirit of my invention. I therefore desire to cover in the annexed claims all such modifications.

Having thus described my invention what I claim as new and desire to secure by Letters Patent is:—

1. An automatic balancing mechanism for air craft, comprising balancing devices, operating means for the same, control means for said operating means, and means independent of said control means for causing deflection of said balancing devices through said operating means at a rate which increases with the increased angle of list.

2. In combination an aircraft, balancing devices for the same, operating means for the balancing devices, and position controlled means for causing deflection of said balancing devices through said operating means at a rate which increases throughout the entire angle of list proportionally to the increase in said angle of list, together with a follow up device connected with said position controlled means to coördinate the degree of operation of the balancing devices with the angle of list of the craft.

3. In combination, an aircraft, balancing devices for the same, a power driven motor device for operating said balancing devices, said motor device having a predetermined initial rate of operation, and position controlled means governing the subsequent rate of operation of said motor device and adapted to increase the rate of operation thereof proportionally to the increase in any given angle of list of the craft, together with a follow up device connected with said position controlled means to coördinate the degree of operation of the balancing devices with the angle of list of the craft.

4. In combination, an aircraft having balancing devices, operating means for said balancing devices, having a predetermined normal rate of operation under normal conditions, and means responsive to abnormal conditions of operation of said craft to change the said normal rate of operation of said operating device proportionally to the change in operating conditions of the craft from normal, together with a follow up device connected with said operating means to coördinate the degree of operation of the balancing devices with the angle of list of the craft.

5. An automatic balancing mechanism for air craft comprising balancing devices for the same, operating means for the balancing devices comprising a fluid motor, a source of fluid pressure, a standard of position governing the operation of said motor from said source, a by-pass between the source and the motor, a normally open valve controlling said by-pass, and a second standard of position operating to close said valve a degree proportional to the angle of list of the craft.

6. An automatic balancing mechanism for an air craft comprising balancing devices for the same, operating means for the balancing devices comprising a double acting fluid motor, a source of fluid pressure, supply conduits leading from the source to the motor, a by-pass return to said source of fluid pressure and a single double acting piston valve normally maintaining said conduits closed and said by-pass open, and a standard of position connected for operating the valve upon list of the craft to close the by-pass and open the one or the other supply conduit to admit fluid to the motor.

7. An automatic balancing mechanism for air craft comprising balancing devices for the same, a fluid motor adapted to operate said balancing devices, a source of fluid pressure means for conducting fluid from the source to the motor, means connecting the fluid motor to the balancing devices, a standard of position governing the operation of said motor, and means apart from the standard of position for rendering said fluid motor instantly inert and thereby releasing the balancing devices from the automatic control at will.

8. An automatic balancing mechanism for air craft comprising balancing devices for the same, a fluid motor adapted to operate said balancing devices, means for conducting fluid from the source to the motor, means connecting the fluid motor to the balancing devices, means comprising a normally closed by-pass to the motor and means for opening said by-pass for rendering the fluid motor inert and thereby releasing the balancing devices from the automatic control.

9. In an air craft in combination, balancing devices, a fluid pressure operating motor for the same which is retained in its various operating positions by fluid pressure, a standard of position governing the operation of the same, and means apart from the standard of position for instantly and at will releasing all pressure from the said motor whereby the balancing devices may return freely to normal position.

10. In an air craft in combination, balancing devices, a fluid pressure operating motor for the same which is retained in its various operating positions by fluid pressure, a standard of position governing the operation of the same, manual control means connected to operate said balancing devices through movement of said motor, and additional means for instantly releasing said fluid pressure.

11. In an air craft in combination, balancing devices, an operating device for the same adapted to retain the balancing devices in operated positions, a source of power for said operating device, and means independent of the connection of the source of power and also independent of the connection of the balancing devices with the operating device for instantly releasing said balancing devices from retention in any operated position.

In testimony whereof I have hereunto set my hand in presence of two subscribing witnesses.

JOHN P. TARBOX.

Witnesses:
ARTHUR L. BRYANT,
G. M. STUCKER.